United States Patent [19]

Neeser et al.

[11] Patent Number: 5,181,225
[45] Date of Patent: Jan. 19, 1993

[54] RECEIVER FOR A DSSS SIGNAL

[75] Inventors: Fredy D. Neeser; Markus D. Hufschmid, both of Zurich; Jürg P. Ruprecht, Muri, all of Switzerland

[73] Assignee: Ascom Tech. AG., Bern, Switzerland

[21] Appl. No.: 795,477

[22] Filed: Nov. 21, 1991

[30] Foreign Application Priority Data

Nov. 22, 1990 [CH] Switzerland ............... 3701/90

[51] Int. Cl.$^5$ .................. H04L 9/20; H04B 1/12
[52] U.S. Cl. ........................ 375/1; 375/103; 375/14
[58] Field of Search .......... 375/1, 14, 103; 455/63

[56] References Cited

U.S. PATENT DOCUMENTS

| | | | |
|---|---|---|---|
| 3,792,356 | 2/1974 | Kobayashi et al. | 375/14 |
| 4,315,319 | 2/1982 | White | 455/63 X |
| 4,458,328 | 7/1984 | Kino et al. | 375/14 X |
| 4,519,084 | 5/1985 | Langseth | 375/103 X |

OTHER PUBLICATIONS

"Principles of Communication Systems", W. Taub, D. L. Schilling, McGraw Hill, Singapore 1986, pp. 720-727, Chapter Seventeen, 'Spread Spectrum Modulation'.

IEEE Communications Magazine, May 1979, pp. 11-18, "Spread Spectrum Communications-Myths and Realities", A. J. Viterbi.

Dissertation by Jürg Ruprecht, Diss. ETH No. 8789, Swiss Federal Institute of Technology, Zürich, Switzerland, 1989, Hartung-Gorre Publishers, "Maximum-Likelihood Estimation of Multipath Channels".

*Primary Examiner*—Gilberto Barron, Jr.
*Attorney, Agent, or Firm*—Brady, O'Boyle & Gates

[57] ABSTRACT

In a receiver (3) for a DSSS signal (DSSS=direct sequence spread spectrum), an inverse filter (12) is utilized in place of a matched filter for detecting the symbols ($B_m$). The inverse filter (12) is distinguished in that it responds to the predetermined pulse sequence as such with a pure Kronecker delta sequence. Preferably, the DSSS signal is generated with a pulse sequence realizing a maximum process gain.

10 Claims, 3 Drawing Sheets

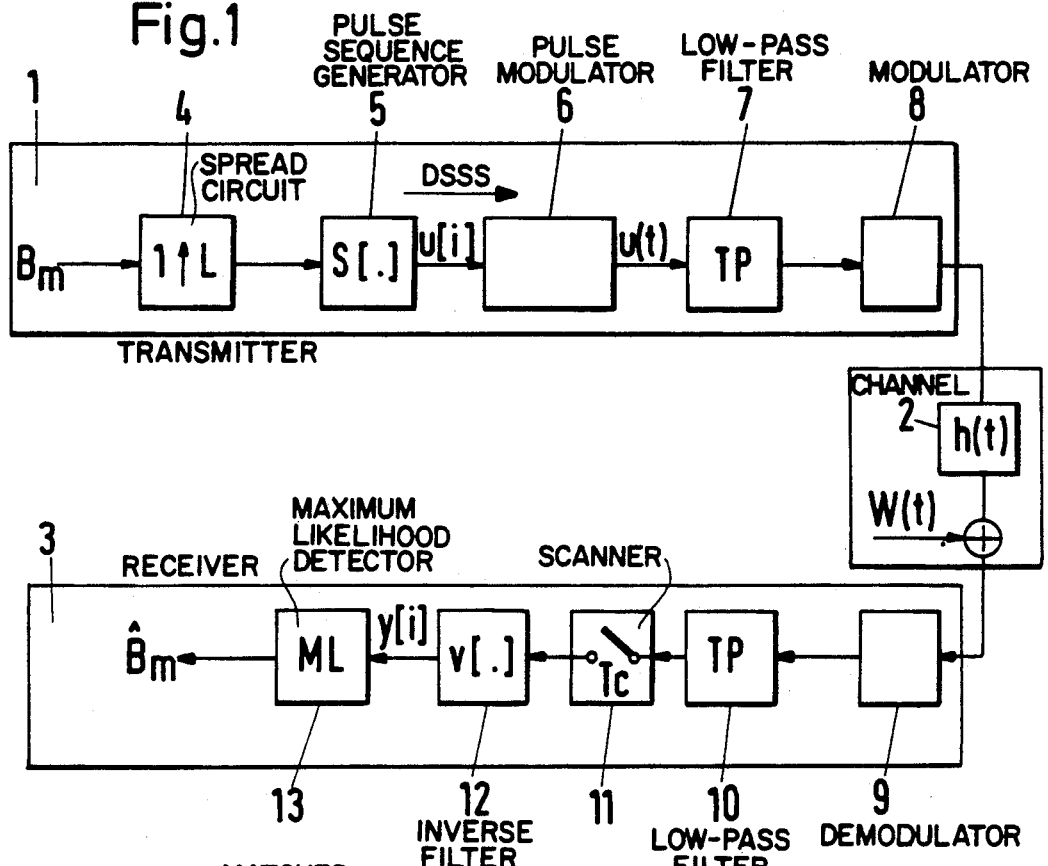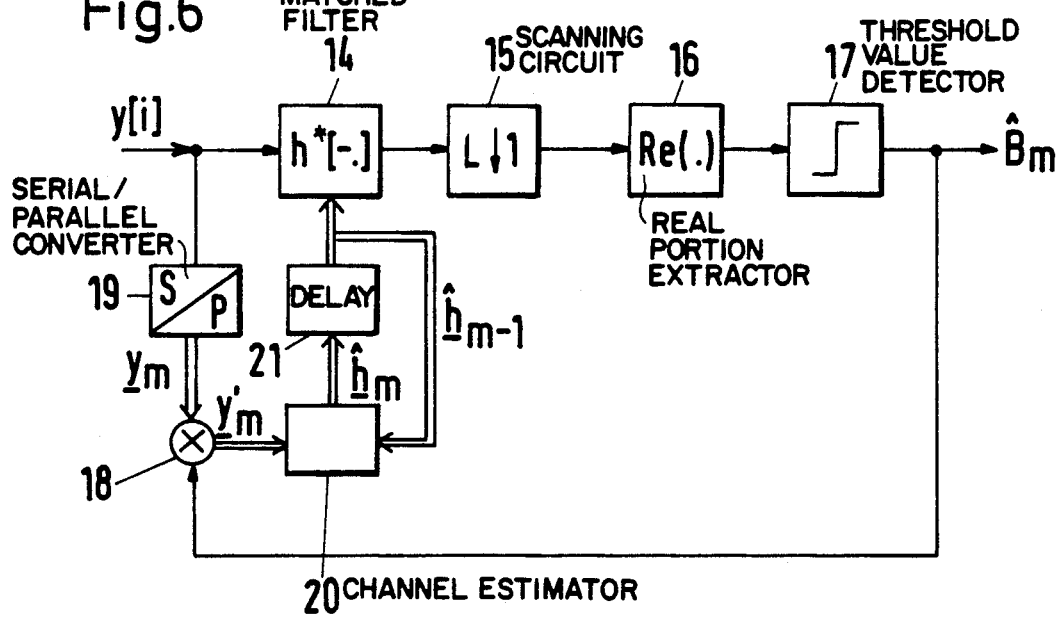

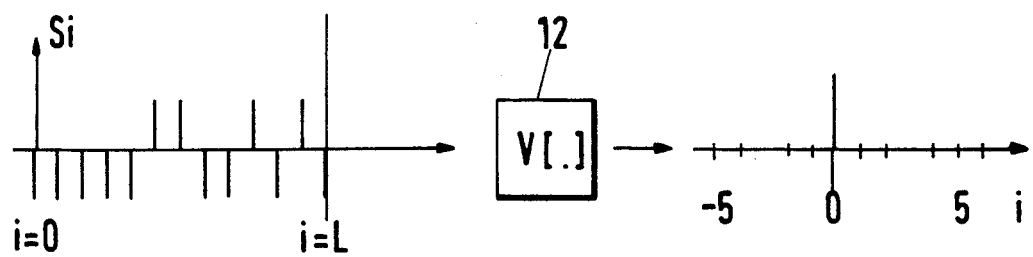
Fig.2
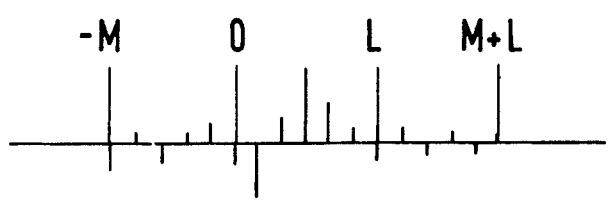
Fig.3
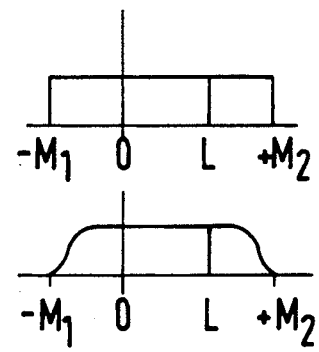
Fig.4(a)
Fig.4(b)
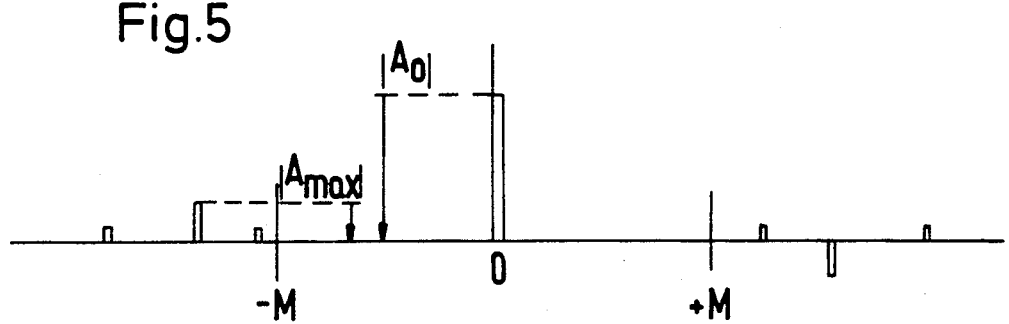
Fig.5

Fig.7(a)
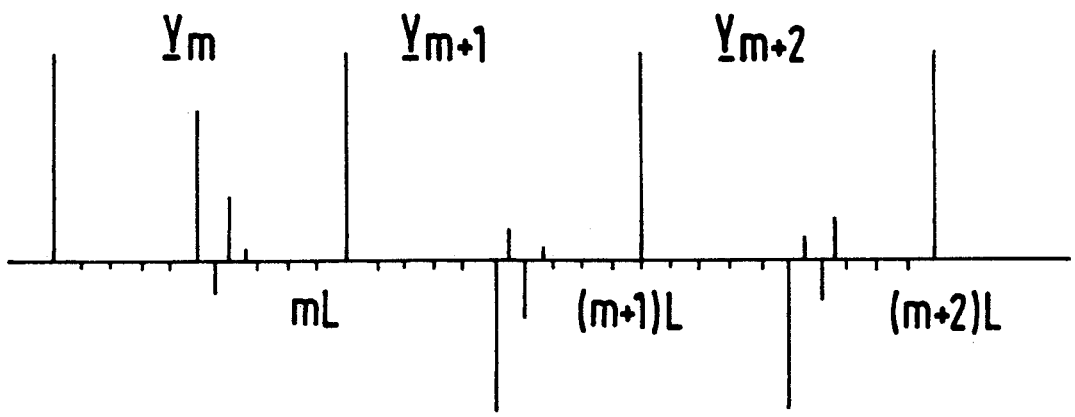
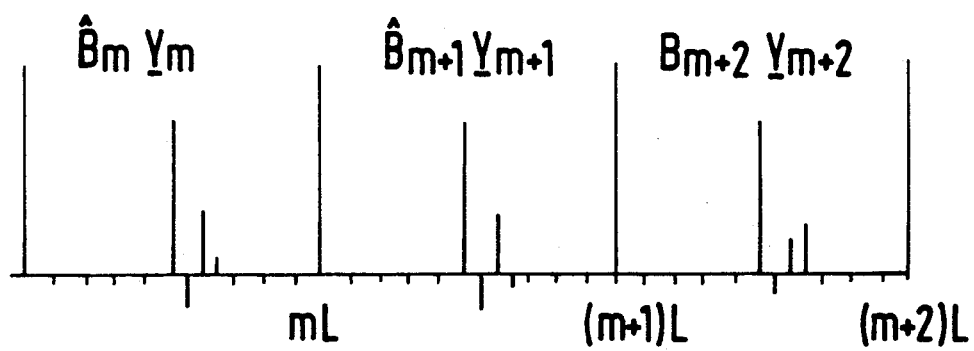
Fig. 7(b)

RECEIVER FOR A DSSS SIGNAL

FIELD OF ART

The invention relates to a receiver for a DSSS signal (DSSS=direct sequence spread spectrum) wherein digital data in the form of symbols are spread out in the DSSS signal with a predetermined pulse sequence having the length L.

STATE OF THE ART

Efforts have been underway for some time to realize a digital mobile radio network. Corresponding standards have already been defined as well (for example, GSM: Narrow-Band Pan-European Mobile Radio System; CD 900: Civil Band-Spread System). However, development has nowise reached its end. There is still the question how to optimally utilize the terrestrial mobile radio channel, eminently poorly suited for the transmission of digital data, in principle. There is not only the objective of eliminating, in the best possible way, the occurring disturbances (multipath propagation, time- and frequency-dependent fading, etc.), but also the goal of efficiently realizing this feature from the viewpoints of circuitry and bandwidth.

Band-spread systems tailored a priori to multipath propagation of the mobile wireless transmission channel are relatively immune to jamming but exhibit the drawback that their implementation is expensive. For these reasons the band-spread technique has been restricted primarily to military applications.

The principle in the transmission of a so-called direct sequence spread spectrum signal, called briefly DSSS signal hereinbelow, resides in that the data to be transmitted are multiplied with a predetermined pulse sequence having the length L. In this process, the pulse sequence has a chip rate amounting to L-fold the symbol rate. In the receiver, the DSSS signal is detected with a so-called matched filter or with a correlator (compare "Principles of Communication Systems", W. Taub, D. L. Schilling, McGraw Hill, Singapore 1986, pp. 720-727).

An analysis of the advantages and drawbacks of DSSS systems is provided by the article "Spread Spectrum Communications - Myths and Realities", A. J. Viterbi, IEEE Communications Magazine, May 1979, pp. 11-18.

In order to be able to create a reliable data transmission, it is important to determine the channel transient response. In mobile radio systems where the participants are constantly in motion, it is, of course, impossible to measure the channel once and for all and to set the filter correspondingly in the receiver. Rather, a method must be devised which determines the channel transient response continuously or at regular time intervals.

In this connection, attention is to be invited to the dissertation by Jürg Ruprecht, "Maximum-Likelihood Estimation of Multipath Channels", Diss. ETH No. 8789, Zuerich, 1989, Hartung-Gorre publishers. The task of channel estimation, important for mobile radio, is attained by transmitting a known pulse sequence having well-defined properties via the channel and filtering same in the receiver by a filter inverse with respect to the pulse sequence The inverse filter here reacts to the transmitted pulse sequence in such a way that the desired pulse response of the channel appears at the output of the filter.

SUMMARY OF THE INVENTION

It is an object of the invention to provide a receiver of the type discussed above suitable, in particular, for receiving digital data on mobile wireless transmission channels and lending itself to being efficiently implemented from the viewpoint of circuit technology.

According to the invention, this object has been attained by providing, for detecting the symbols, an approximated inverse filter which, upon excitation by the predetermined pulse sequence (s[.]) as such responds approximately with a Kronecker delta sequence as the output sequence.

The basic aspect of the invention resides in that, for detecting the data, the DSSS signal is processed by means of an inverse filter rather than with a matched filter. The matched filter, though being the better filter with respect to maximum signal-to-noise ratio, is surpassed by factors by the inverse filter with regard to the so-called peak/off peak ratio (ratio of maximum amplitude to largest spurious amplitude of the filtered DSSS signal). The pulse peaks at the filter output, containing the transmitted data, thus can be detected in a simpler and more reliable fashion.

There is a substantial difference between the transmission of data and the channel estimation by means of known pulse sequences. In channel estimation, the receiver knows the transmitted "data", namely the individual chips of the pulse sequence, beforehand with regard to amount and arithmetic sign, whereas in data detection unknown data (symbols) with which the pulse sequence is multiplied must be determined. The pulse sequence utilized in the DSSS signal is known as such to the receiver, but this is not true for the symbol with which the sequence has been multiplied in the concrete instance.

A substantial advantage of the invention resides in that the channel estimation is integrated into the data detection, for it constitutes part thereof. Correspondingly, the circuitry required for the receiver side is smaller than in the conventional matched filter receivers.

The ideal inverse filter has infinitely many coefficients. It reacts to the pulse sequence as such with a pure Kronecker delta sequence, i.e. the digital system response is different from zero only at the instant i=0. (With a filter length of L+2M, this corresponds to the borderline case $M \to \infty$.)

Under practical conditions, the inverse filter can, of course, be realized only in an approximation. However, because the coefficients v[k] of the ideal inverse filter, in case of a suitably selected pulse sequence, will disintegrate exponentially for large k, rather satisfactory results can be achieved already with filters of reasonable length. In accordance with an advantageous embodiment, the coefficients v[k] of the inverse filter obey the following relationship:

$$v[k] = \frac{1}{2\pi} \int_{-\pi}^{\pi} \frac{d\Omega}{\sum_{i=0}^{L-1} s[i]e^{j(i-k)\Omega}}, \quad k = -M_1 \ldots L + M_2,$$

$$v[k] = 0, \text{ for } k < -M_1 \text{ and } k > L + M_2.$$

For $-M_1 \leq k \leq L+M_2$, the filter coefficients correspond to the ideal case; outside of the mentioned range they are simply set at zero. The approximated inverse filter therefore corresponds to the truncated ideal inverse filter ($M_1$ and $M_2$ are predeterminable numbers, i.e. so-called design parameters).

An alternative resides in limiting with respect to time and advantageously weighting the coefficients by multiplication with a suitable window function.

There are various approximation strategies. Besides truncation of the ideal inverse filter, the following two approximation solutions are of importance, in particular:

1. Least square approximation;
2. Approximation for maximum POP ratio.

In the first case, the approximated inverse filter responds upon excitation by the predetermined pulse sequence (s[.]) as such with an output sequence approximating the Kronecker delta sequence along the lines of minimum errors squared.

In the second case, the output sequence has a maximum peak/off peak ratio. In other words, the largest secondary peak is made as small as possible as related to the main peak. This involves an approximation to the infinitely large peak/off peak ratio of a Kronecker delta sequence.

The pulse sequence is preferably chosen so that it results in a maximum process gain G. In this connection, process gain is understood to mean the inverse of the energy of the inverse filter.

$$G = \frac{1}{\sum_{i=-\infty}^{+\infty} v[i]^2}$$

Thus, the process gain should come maximally close to the matched filter bound, i.e. the theoretically determined upper limit. The matched filter bound corresponds to the sequence length L, i.e. $G \leq L$.

In other words The process gain G of the selected pulse sequence should be maximal with respect to as many as possible, especially all, pulse sequences of a given length L.

Maximizing of the process gain leads to an MMSE estimation of the channel (minimum mean square error).

After the inverse filter, a so-called "matched filter detector" called, in short, MF detector, is preferably connected. This is a circuit arrangement comprising essentially a matched filter adapted to the channel and a threshold value detector The MF detector provides, in first approximation, a maximum likelihood detection of the data symbols.

By the use of the inverse filter, channel estimation is delivered concomitantly with the data detection almost automatically. It is recommended, along the lines of a decision return (decision feedback), with the aid of the data estimated in the receiver to cancel the multiplicative effect of the symbols on the output signal of the inverse filter (reduction of the output signal), to average the channel transient responses obtained in the various symbol intervals, and to use same for setting the coefficients of the channel-adapted matched filter.

In order to be able to estimate the channel transient response in a maximally distortion-free fashion, the symbols should have a symbol period larger than the duration of the channel transient response.

In view of the signal amplification in the transmitter, it is advantageous for the pulse sequence to have a constant envelope curve. This means nothing else but that the individual pulses of the sequence are all identical with regard to their amount.

The invention can be realized in a particularly simple way with binary pulse sequences and, selectively, also with binary symbols. The reduction of the output signal mentioned in connection with the channel estimation then requires essentially a simple multiplication.

A typical field of use for the invention is the mobile radio technology, be it in the macro- or in the microcellular region. The advantages of the DSSS signals in conjunction with the inverse filter will become apparent, above all, in so-called in-house applications (microcellular mode) since here the signal transit times and the duration of the pulse responses are relatively small (typically < 500 ns).

From the totality of the dependent claims, additional advantageous embodiments can be derived.

BRIEF DESCRIPTION OF THE DRAWINGS

The invention will be described in greater detail below with reference to embodiments and in conjunction with the drawings wherein:

FIG. 1 is a schematic view of the transmitter and of the receiver;

FIG. 2 shows the functional principle of the ideal inverse filter;

FIG. 3 shows a schematic view of the inverse filter;

FIGS. 4a, and 4b show schematic views of a window function for the inverse filter;

FIG. 5 shows the functional principle of the real inverse filter;

FIG. 6 is a block circuit diagram of an MF detector with decision feedback; and

FIGS. 7a, and 7b show the principle of channel estimation.

The reference numerals utilized in the drawings and their meanings are summarized in the list of symbols. Basically, identical parts in the figures bear the same reference symbols.

WAYS OF EXECUTING THE INVENTION

FIG. 1 shows the illustration, in principle, of a transmitter/receiver structure according to this invention. A transmitter 1 which, for example, is part of a radiotelephone transmits digital data (e.g. a digitalized voice signal) via a channel 2 to a receiver 3, for example to a base station of the mobile radio system. The channel 2 has a time-variant transient response h(t) typically characterized by a multipath propagation. The transmission signal is furthermore heterodyned by additive white Gaussian noise W(t).

The digital data are present in the transmitter in the form of symbols $B_m$ at a given time interval $T_s$ (symbol period). In a spreading circuit 4, the symbol period $T_s$ is divided into a predetermined number of L chip intervals $T_c$ (chip period), i.e. $T_s = LT_c$ The output signal is identical to zero in all chip intervals save one. For the sake of simplicity, it is assumed that this is the first interval.

A pulse sequence generator 5 produces, from the chronologically expanded symbols, a DSSS signal of the form:

$$U[i] = \sum_m B_m s[i - mL]. \qquad (I)$$

The DSSS signal U[i] thus is composed of time segments having the length $LT_s$ wherein there are accommodated in each case the L pulses of the pulse sequence s[.], multiplied with the symbol $B_m$.

The DSSS signal U[i] is converted in a subsequently connected pulse modulator 6 and a low-pass filter 7 into a time-continuous signal, limited with respect to frequency, which is then modulated in a conventional modulator 8 onto a carrier oscillation in a manner known per se.

The transmitted DSSS signal is first demodulated from the carrier oscillation in the receiver 3 (demodulator 9), freed of undesirable frequency components in a low-pass filter 10, and thereafter scanned in correspondence with the chip rate $1/T_c$ (scanner 11).

In accordance with the basic aspect of the invention, the now present received signal is processed through an inverse filter 12. The output signal Y[i] of the inverse filter is finally evaluated by an ML (maximum likelihood) detector 13 so that lastly the estimated symbols ($B_m$ characterized by a circumflex) are present.

The properties and effects of this central inverse filter 12 will be described in detail below.

FIG. 2 illustrates the effect of the inverse filter 12. It is tuned in a quite specific way to the pulse sequence s[.] utilized by the transmitter. The left-hand half of the figure shows, as an example, an aperiodic pulse sequence $s[.]=\{s_0, \ldots, s_L\}$ of the length $L=13$ ($s[i]=0$ for $i<0$ and $i>L$). When introducing the sequence as such into the corresponding inverse filter v[.], then, in the ideal case, there results as the system response a Kronecker delta sequence $\delta[k]$ (see right-hand half of the figure). Such a sequence is distinguished, as is known, by the fact that it is different from zero only at the instant $i=0$:

$$\sum_{i=0}^{L-1} s[i]v[k-i] = \delta[k]. \quad (II)$$

The ideal inverse filter has an infinite number of filter coefficients v[k]. Under practical conditions, such a filter cannot, of course, be realized exactly. For this reason, the inverse filter is limited to a length of $-M_1 \leq k \leq M_2+L$. Outside of this window, the filter coefficients v[k] are identical to zero. The $L+M_1+M_2$ filter coefficients are fixed so that the output signal of the inverse filter resulting upon excitation with the pulse sequence s[.] approximates maximally well the Kronecker delta sequence $\delta[k]$. The type of approximation is defined with a suitable mathematical criterion. Three advantageous approximation strategies shall be mentioned below.

The filter coefficients v[k] different from zero are chosen, according to a first embodiment of the invention, so that the system response to the corresponding pulse frequency corresponds to a Kronecker delta sequence only within a predetermined time window. In other words, within the time window having the length $-M_1 \ldots +M_2$, the system response is different from zero only at the chronological zero point ($i=0$). Outside of the aforementioned window, in contrast thereto, there will definitely occur secondary peaks.

FIG. 3 shows schematically the coefficients of an inverse filter. L denotes the length of the corresponding pulse sequence. Based on L, the inverse filter is lengthened on both sides by a predetermined number $M_1$ and, respectively, $M_2$, of coefficients. Thus, in total, it has $L+M_1+M_2$ filter coefficients. In accordance with a preferred embodiment, they obey the following rule:

$$v[k] = \frac{1}{2\pi} \int_{-\pi}^{\pi} \frac{d\Omega}{\sum_{i=0}^{L-1} s[i]e^{j(i-k)\Omega}}, \quad k = -M_1 \ldots L+M_2, \quad (III)$$

$v[k] = 0$, for $k < -M_1$ and $k > L+M_2$.

For $-M_1 \leq k \leq L+M_2$, the filter coefficients correspond to the ideal coefficients; outside of the mentioned range they are simply set at zero (truncation). A thus-designed filter has been known as such from the above-mentioned publication by J. Ruprecht. It was also demonstrated in the latter that the coefficients (with suitable choice of the pulse sequence) will disintegrate exponentially for large k and consequently the truncation will yield definitely usable results.

An alternative to truncation is represented by weighting with a window function which, at the margin, passes gently rather than abruptly toward zero.

FIG. 4 illustrates the two variants. In FIG. 4a, the truncation (constant weighting within the window) is shown, and FIG. 4b illustrates a window function with weighting that levels off at the margin.

FIG. 5 shows the effect of truncation on the system response of the inverse filter when introducing the corresponding pulse sequence as such. A single peak occurs within the time window $-M_1 \ldots +M_2$. Outside thereof, several secondary peaks occur (in principle, an infinite number). However, these are very small and can be covered by means of the POP ratio. The POP ratio is defined as the ratio between the amount of the amplitude of the main pulse $A_0$ and that of the largest secondary pulse $A_{max}$.

Besides the just-described strategies, there are still two more preferred approximation strategies:
1. Least square
2. Approximation for maximum POP ratio.

In the first case, the approximated inverse filter, upon excitation by the preset pulse sequence s[.] as such, responds with an output sequence approximating the Kronecker delta sequence $\delta[k]$ in the sense of the smallest square errors:

$$\sum_{i=0}^{L-1} s[i]v[k-i] - \delta[k] = \epsilon[k],$$

wherein $$\Sigma \epsilon^2[k] = \text{minimal}.$$

In the second case, the output sequence has a maximum peak/off peak ratio. In other words, the largest secondary peak is made as small as possible as compared with the main peak. Here an approximation is involved to the infinitely large POP ratio of a Kronecker delta sequence.

An important property of the inverse filter resides in that these secondary peaks, which can be quantitatively covered mathematically with the peak/off peak ratio, (POP ratio), can be kept very small with a suitable choice of the pulse sequence.

A central advantage of the inverse filter thus resides in that its POP ratio is much larger than that of a matched filter (respectively correlator). Whereas the POP ratio in a matched filter typically ranges at about 10, even a poor inverse filter realizes POP ratios of 100 and more. With optimization, it is normally possible to easily attain 30-40 dB. The inverse filter, in this aspect, is thus superior by orders of magnitude to the matched filter. It is interesting to note that this advantage need not be obtained at the cost of a correspondingly grave impairment of the signal-to-noise ratio.

Preferably, the pulse sequence s[.] is designed so that the inverse filter exhibits a maximum process gain G (process gain). Process gain in this connection is understood to mean the inverse of the energy of the inverse filter:

$$G = \frac{1}{\sum_{i=-\infty}^{+\infty} v[i]^2} \qquad (V)$$

If, for one L, there exist several pulse sequences with the same G, then it is recommended (with a given $M_1$ and $M_2$) to select the one having the largest POP ratio. Examples of such so-called optimal sequences ("best invertible sequences") can be derived from the dissertation by J. Ruprecht. However, for practical applications, lengths of below L=10 are meaningless. Rather, relatively large lengths are desirable (for example L going toward 100).

For large lengths (e.g. L>100), it is difficult, if not impossible (since the calculating time for calculating $2^L$ possibilities if frequently too long) to find the pulse sequence having the maximum process gain with respect to all sequences. Therefore, under practical conditions, a group of L sequences with tendentially good properties will be chosen, and the process gain will be optimized with respect to this limited group. The sought-for process gain will then represent a relative maximum.

With a view toward signal amplification in the transmitter, it is advantageous for the pulse sequence to have a constant envelope curve. This means nothing else but that the individual pulses of the sequence are all of the same size with regard to their amount. Preferably, a binary sequence is involved (i.e. s[i]= +/−1). The maximum transmission power then corresponds precisely to the mean power.

A great advantage of the invention resides in that the channel estimation is concomitantly provided almost without any additional effort as a "by-product" of the data detection. The DSSS signal transformed during transmission over the channel namely does not produce at the output of the inverse filter a pure Kronecker delta sequence but rather yields the (equivalent, time-discrete) transmission function h[.] of the channel, multiplied by the symbol value $B_m$. The problem, now, resides in that the receiver does not know the transmitted symbols. The following description will explain how the data detection and the channel estimation are performed.

FIG. 6 shows in detail the functional blocks contained by the ML (maximum likelihood) detector 13 illustrated in FIG. 1. In principle, two tasks are accomplished: Firstly, the symbol detection according to the ML principle and, secondly, the channel estimation along the lines of a decision feedback.

The symbol detection proceeds in accordance with a process known per se. First of all, the output signal Y[i] is filtered by a matched filter 14 with the transient response h*[−.] ("*" denotes the conjugated-complex value; "−" denotes the time reversal). The filter 14 is thus adapted to the time-discrete channel h[.] equivalent to channel 2. Thereafter, in a scanning circuit 15, the correlation maximum is scanned and thus the clock rate is reduced by the factor L. Thus, a changeover is made again from the chip interval $T_c$ to the symbol period $T_s$.

In order to obtain the estimated symbol values $B_m$, it is sufficient to reduce the complex-value scanned output signal of the matched filter 14 to the real portion (real portion extractor 16) and to effect discrimination with a threshold value detector 17.

For the channel estimation, the output signal Y[i] of the inverse filter is converted in a serial/parallel converter 19. The signal values Y[i] scanned with the chip period $T_c$ are converted into vectors $\underline{Y}_m$ of the dimension L. Each vector $\underline{Y}_m$ contains the scanning values lying within the same symbol interval m. Each vector $\underline{Y}_m$ corresponds to a sample function of the channel transient response multiplied by an unknown symbol value.

The symbols estimated in the data detection path are then utilized for "reducing" the aforementioned vectors $\underline{Y}_m$, i.e. for eliminating the multiplicative "symbol proportion" (in principle by means of a division). In the preferred binary case ($B_m = +/-1$), the reduction consists essentially in a multiplication 18 (since $s_i^2 = 1$ applies).

The thus-reduced vectors $\underline{Y}_m'$ m are fed into a channel estimator 20. According to a preferred embodiment, the latter performs averaging over various vectors (averaging over several realizations of the channel transient response which is burdened by noise and changes gradually with time):

$$h_m = \sum_{i=-\infty}^{m} w_i Y_i' \qquad (VI)$$

Averaging is realized, for example, with the aid of a delay member 21 and a feedback path. The type of averaging is determined by the choice of the weighting factors $w_i$. The weighting factors wi proper can be fixed according to conventional principles. Of course, it is also possible to utilize more sophisticated methods for channel estimation.

The filter coefficients of the matched filter 14 are the time-inverted and conjugated-complex components of the averaged vectors.

FIGS. 7a, b are to illustrate the procedure in channel estimation for the binary case. In each case, the time is plotted on the abscissa and the signal amplitude on the ordinate. FIG. 7a shows the output signal Y[i] of the inverse filter. Respectively L scanning values are combined into a vector $\underline{Y}_m$. In the present case, the vectors differ essentially only by the polarity (according to the illustration, the following applies regarding the present example: $B_m = +1$, $B_{m+1} = -1$, $B_{m+2} = -1$). The individual vectors $\underline{Y}_m$ are then reduced by multiplying with the estimated symbol value $$B_m$$

Thus, the influence of the unknown data is eliminated; all vectors have the same polarity (FIG. 7b). For the channel estimation, averaging in component fashion is then carried out, as mentioned above.

For a good channel estimation, the symbol period should always be so long that it is larger than the duration of the channel transient response. This ensures that the individual sample functions can be readily separated, i.e. that neighboring transient responses will not overlap.

The prerequisites, in principle, for determining an individual sample function of the channel transient response with the aid of an aperiodic pulse sequence and an inverse filter are described in the cited publication by J. Ruprecht. They can be applied analogously to the channel estimation according to this invention.

Maximizing of the process gain leads to an MMSE estimation of the channel (minimum mean square error). For a good performance, it is recommended to select long sequences with a high process gain G. The maximally realizable process gain, however, is for fundamental reasons never larger than L (so-called "matched filter bound").

As a final remark, it can be noted that a receiver has been created by the invention which utilizes the advantages of the band-spread technique in an efficient way for mobile radio transmission.

List of Symbols

1—transmitter
2—channel
3—receiver
4—spread circuit
5—pulse sequence generator
6—pulse modulator
7—low-pass filter
8—modulator
9—demodulator
10—low-pass filter
11—scanner
12—inverse filter
13—ML detector
14—matched filter
15—scanning circuit
16—real portion extractor
17—threshold value detector
18—multiplication
19—serial/parallel converter
20—channel estimator
21—delay member
$B_m$—symbol
$B_m^{circumflex}$—estimated symbol

We claim:

1. A mobile radio system having at least one base station and several mobile subscriber stations for the exchange of DSSS signals having digital data in the form of symbols ($B_m$) spread out in the DSSS signals with a predetermined pulse sequence (s[.]) having a length (L), comprising a receiver for a DSSS signal in said base station and in each of said several mobile subscriber stations, an approximated inverse filter connected in each said receiver for detecting the symbols ($B_m$) in the incoming signal and connected for excitation by the predetermined pulse sequence (s[.]) to respond approximately with a Kronecker delta sequence as the output sequence, a channel-adapted matched filter connected after said approximated inverse filter in each receiver, and each said channel-adapted matched filter having connected therewith:

(a) first means connected for estimating the transmitted symbols according to the maximum likelihood principle,
(b) second means connected for reducing the output signal of said inverse filter with the use of the estimated symbols to one channel transient response per symbol, and
(c) third means connected for determining the coefficients of said channel-adapted matched filter.

2. A receiver for a DSSS (direct sequence spread spectrum) signal having digital data in the form of symbols ($B_m$) spread out in the DSSS signal with a predetermined pulse sequence (s[.]) having a length (L), comprising an approximated inverse filter connected in said receiver for detecting the symbols ($B_m$) in the incoming signal and connected for excitation by the predetermined pulse sequence (s[.]) to respond approximately with a Kronecker delta sequence as the output sequence, a channel-adapted matched filter connected after said approximated inverse filter, and said channel-adapted matched filter having connected therewith:

(a) first means connected for estimating the transmitted symbols according to the maximum likelihood principle,
(b) second means connected for reducing the output signal of said inverse filter with the use of the estimated symbols to one channel transient response per symbol, and
(c) third means connected for determining the coefficients of said channel-adapted matched filter.

3. A receiver according to claim 2, in which said approximated inverse filter corresponds to the truncated ideal inverse filter, in such a way that the coefficients v[k] of the approximated inverse filter pertaining to the pulse sequence s[.] = ($s_0, \ldots, s_L$) obey the following relationship:

$$v[k] = \frac{1}{2\pi} \int_{-\pi}^{\pi} \frac{d\Omega}{\sum_{i=0}^{L-1} s[i] e^{j(i-k)\Omega}}, k = -M_1 \ldots L + M_2,$$

$$v[k] = 0, \text{ for } k < -M_1 \text{ and } k > L + M_2.$$

4. A receiver according to claim 2, in which said approximated inverse filter with a predetermined number of coefficients v[k], k = $-M_1 \ldots L+M_2$, upon excitation by the predetermined pulse sequence (s[.]) as such, responds with an output sequence approximating the Kronecker delta sequence along the lines of the smallest square errors.

5. A receiver according to claim 2, in which said approximated inverse filter with a predetermined number of coefficients v[k], k = $-M_1 \ldots L+M_2$, upon excitation by the predetermined pulse sequence (s[.]) as such, responds with an output sequence approximating the Kronecker delta sequence along the lines of a maximum peak/off peak ratio.

6. A receiver according to claim 2, in which the pulse sequence s[.] is fixed so that the process gain G, defined by the inverse of the energy of the associated inverse filter:

$$G = \frac{1}{\sum_{i=-\infty}^{+\infty} v[i]^2},$$

comes maximally close to the matched filter bound.

7. A receiver according to claim 1, in which said symbols have a symbol period larger than the duration of the channel transient response plus one chip period.

8. A receiver according to claim 1, in which said third means perform an averaging of the individual channel transient responses.

9. A receiver according to claim 2, in which the pulse sequence has a constant envelope curve.

10. A receiver according to claim 2, in which said symbols are binary, and that said second means, for eliminating the multiplicative influence of the symbols on the output signal of the inverse filter, multiply the aforementioned output signal with the estimated symbols.

* * * * *